June 24, 1958    C. F. HAMMER, JR., ET AL    2,839,967
GUN INTERFERENCE ELIMINATOR
Filed Nov. 13, 1953    7 Sheets-Sheet 1

INVENTORS
C. F. HAMMER, JR.
J. A. TEMPLETON
J. W. MACGREGOR

BY
ATTORNEYS

June 24, 1958  C. F. HAMMER, JR., ET AL  2,839,967
GUN INTERFERENCE ELIMINATOR
Filed Nov. 13, 1953  7 Sheets-Sheet 3
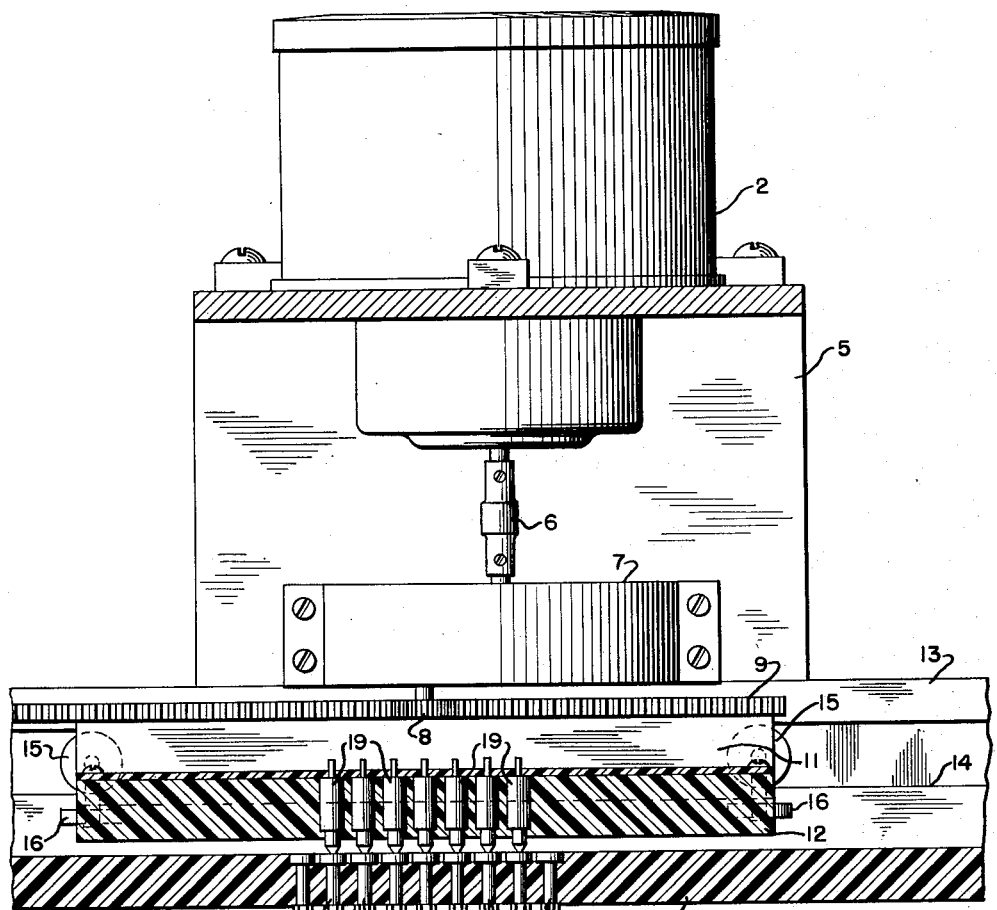
INVENTORS
C. F. HAMMER, JR.
J. A. TEMPLETON
J. W. MACGREGOR
ATTORNEYS

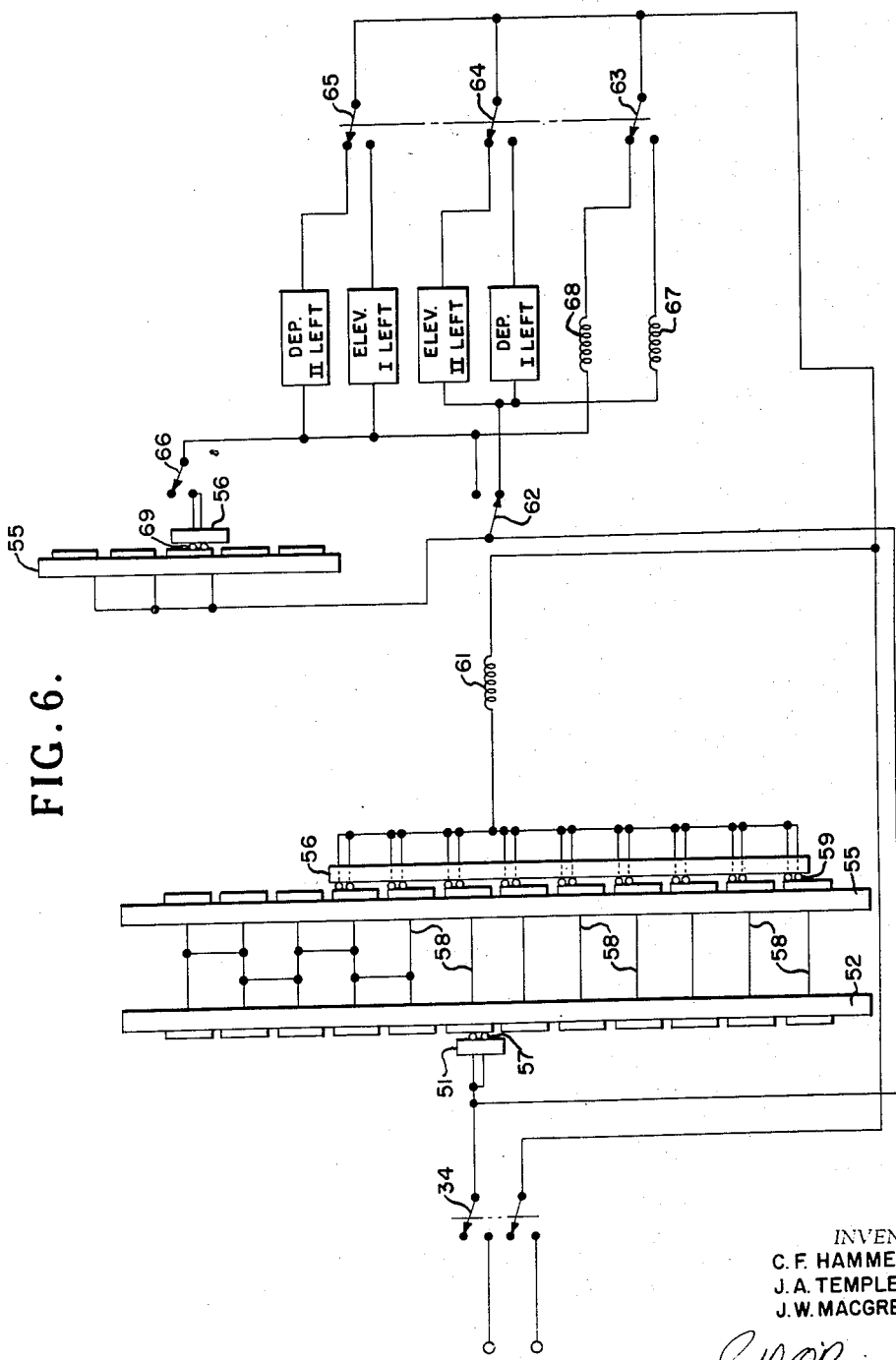

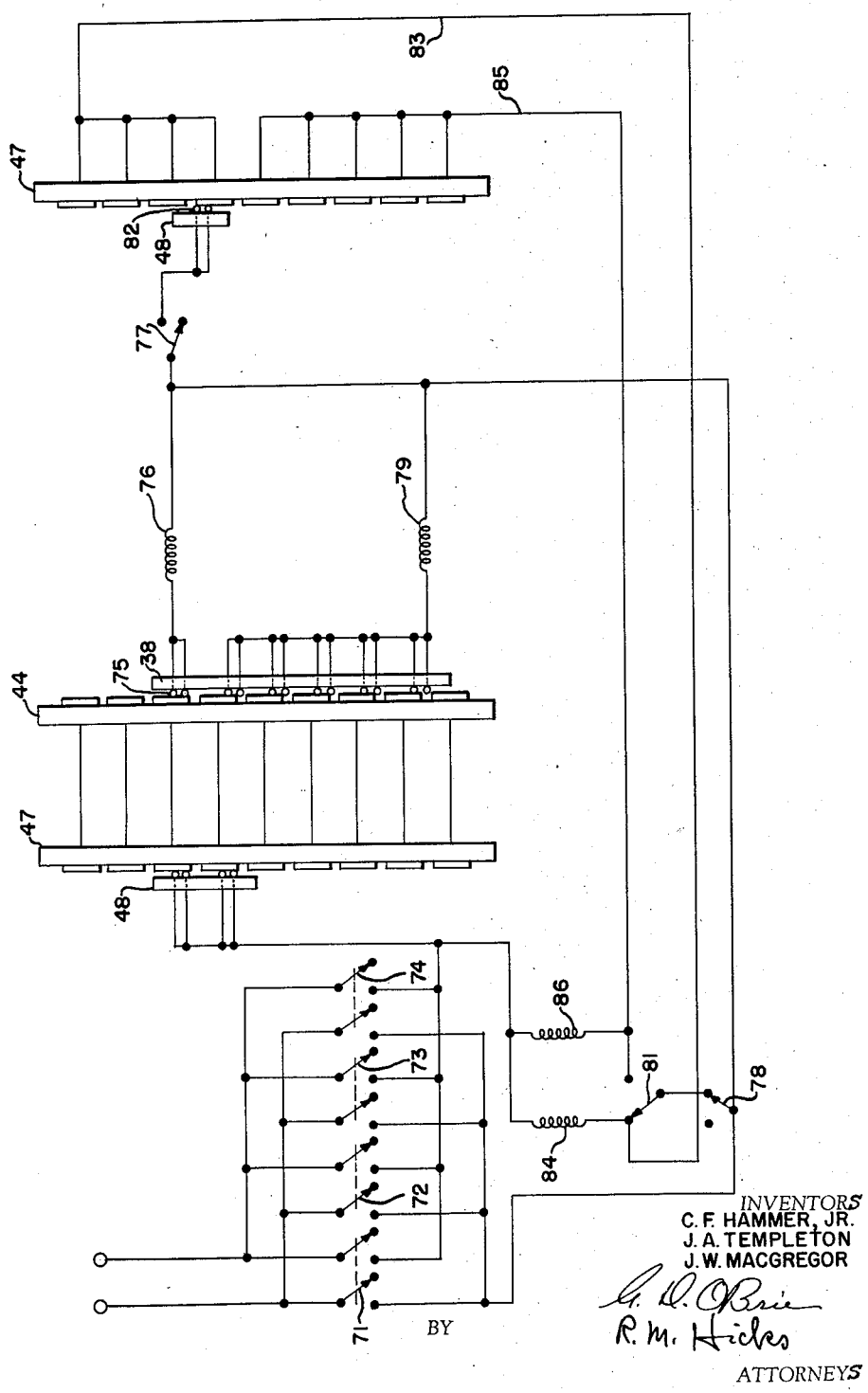

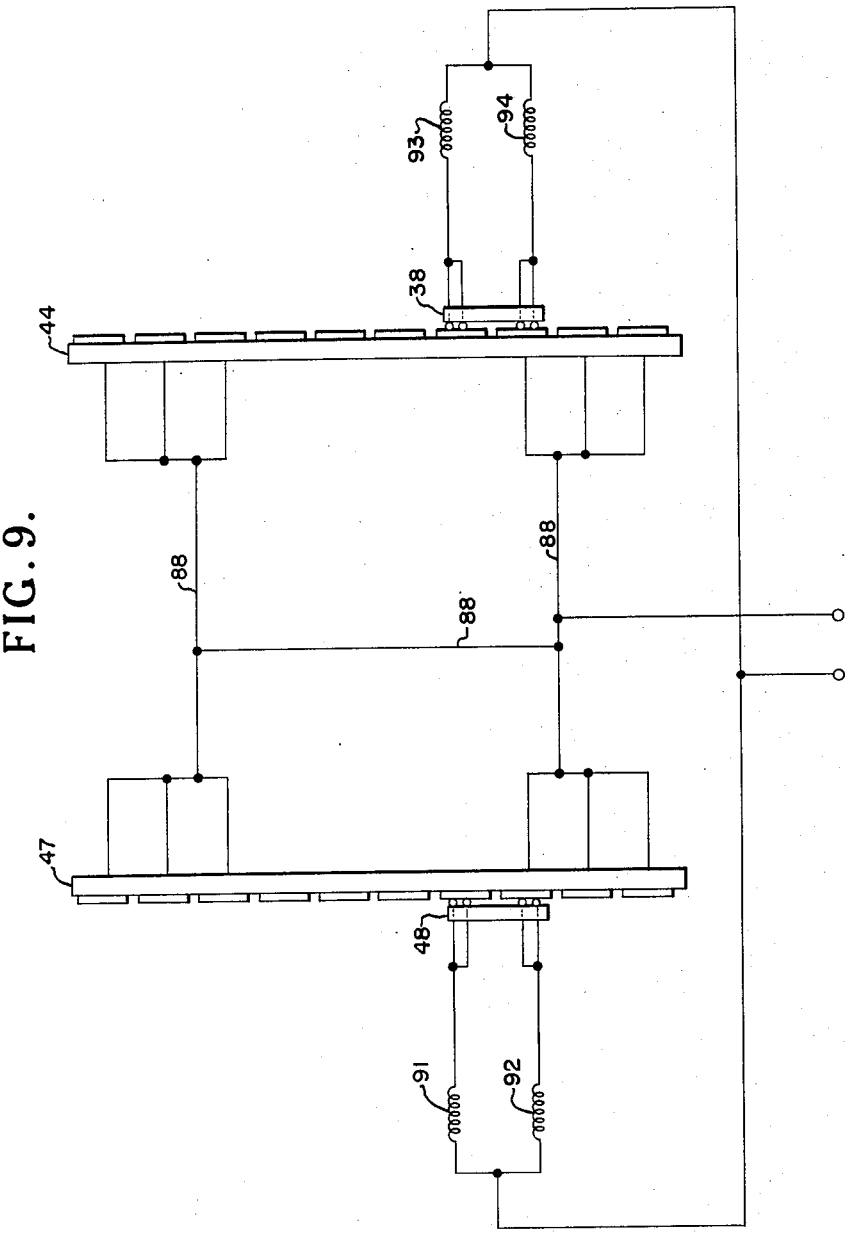

United States Patent Office 2,839,967
Patented June 24, 1958

2,839,967

GUN INTERFERENCE ELIMINATOR

Clarence F. Hammer, Jr., Wilmington, Del., John A. Templeton, Silver Spring, Md., and John W. MacGregor, Columbus, Ohio, assignors to the United States of America as represented by the Secretary of the Navy Application November 13, 1953, Serial No. 392,062

6 Claims. (Cl. 89—41)

(Granted under Title 35, U. S. Code (1952), sec. 266)

The invention described herein may be manufactured and used by or for the Government of the United States of America for governmental purposes without the payment of any royalties thereon or therefor.

This invention relates to a gun interference eliminator and more particularly to a mechanism adapted to prevent collisions between guns in different turrets by automatically removing one of the guns from the collision area.

Heretofore, devices have been provided to prevent interference between guns, such devices involving camming mechanisms which operate stops to limit movement in train and elevation of the guns or involving the solution of relatively complicated formulas through computer devices. These mechanisms while adequate to prevent collisions between guns are inefficient in that they involve too great a loss in fire power, frequently removing both guns from the target. Furthermore, with such devices the amount of available fire power for a particular target is not always predictable. It can be seen that the problem presented is to provide a mechanism which will prevent guns from colloding and at the same time permit a maximum amount of fire power to be utilized.

The mechanism described herein provides both a means for accurately delineating the limits of the collision zone between guns and a means for effectively removing one gun from this area when a collision is imminent. The device is completely automatic in operation and it not only provides a means for forecasting a collision but also establishes the best manner in which this collision may be avoided and transmits signals to the elevation or train mechanism of the gun to be moved to alter the position of that gun in the correct manner. There is provided means for predicting a collision in sufficient time to avoid the same by taking into consideration the relative velocity of the two guns involved. There is further provided a priority system whereby when two guns are on different targets, one target may be assigned priority so that in the event of a collision signal between these guns the non-priority gun will be the one to be moved. In this manner the maximum fire power is always assured and the more important target is always under fire.

This invention includes a series of movable brushes and fixed contact plates. Each contact plate represents the positions of a gun in train or elevation and a brush holder moves over each contact plate in response to movement of a gun in train or elevation. The contact plate is provided with contact elements at positions of the gun which would involve a collision so that when the brush holder moves over the contact element a circuit is completed and a collision signal is transmitted to the priority system. The gun having priority has been predetermined so that the system is set to move only the non-priority gun. The positions of the guns are compared by the same system of contact plates and brush holders and the relay designed to move the non-priority gun in train or elevation is energized according to the most expeditious manner of removing the gun from the collision area as determined by the position comparison. The brush holders are driven over the contact plates by means of synchronous motors and it is necessary to provide additional means to enable a collision to be forecast in time to avoid the same when the guns are approaching one another at a high relative velocity. Such means takes the form of switches which energize brushes on the brush plate in advance of the brush representing the true position of the gun when the gun is moving at a high velocity. In this manner the position of the gun on the brush holder leads the true position of the gun so that a collision may be forecast in sufficient time to be avoided.

An object of this invention is to provide a mechanism for eliminating interference between guns and for maintaining a maximum amount of fire power available at all times.

Another object of this invention is to provide a gun interference eliminator which incorporates a priority system whereby a gun assigned priority will be maintained on target at all times and a gun which is in the interference zone with respect to the priority gun will be moved out of the interference zone.

Still another object of this invention is the provision of a gun interference eliminator in which the positions of the guns are translated into electrical signals and by means of which a collision may be forecast in time to avoid the same.

A further object of this invention is the provision of a mechanism in a gun interference eliminator whereby the most effective manner of avoiding a collision is automatically calculated and the correct signal transmitted to fire control.

Other objects and many of the attendant advantages of this invention will be readily appreciated as the same becomes better understood by reference to the following detailed description when considered in connection with the accompanying drawings wherein:

Fig. 3 is a sectional view of a control unit taken along the line 3—3 of Fig. 2;

Fig. 6 is a diagram of an elevation priority circuit;

Fig. 7 is a diagram of a train priority circuit;

Fig. 8 is a graph showing a typical collision zone; and,

Fig. 9 is a diagram of a fringe circuit.

Figure 1:
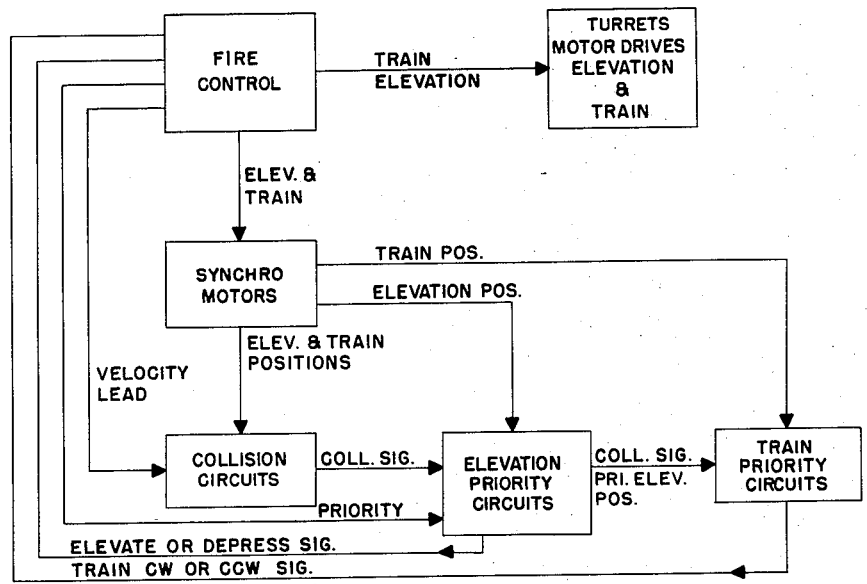
Fig. 1 is a block diagram showing the general arrangement of the interference system herein disclosed.

Referring now to the drawings and more particularly to Fig. 1 it can be seen that the operation of the train and elevation motors of the guns is controlled by the fire control station. These same signals are transmitted to synchronous motors which drive a series of brushes over contact plates as represented by the collision circuits. When a circuit through these contact plates and brushes is completed a relay is closed whereby a collision signal is developed. This signal is transmitted through the elevation priority circuit which compares the positions of the interfering guns and develops an elevation or depression signal or energizes the train priority circuit which produces a signal to train clockwise or counterclockwise so as to avoid a collision. The signals developed by the priority circuits are transmitted to the fire control station which energizes the motor drives of the non-priority gun to move it out of the collision area. It can be seen that a velocity lead is applied to the collision circuits from fire control. This permits a collision to the forecast by taking into consideration the relative velocity of the guns.

The priority is assigned from the fire control station so that the circuit is set to transmit motion signals to the non-priority gun only.

Figure 2:
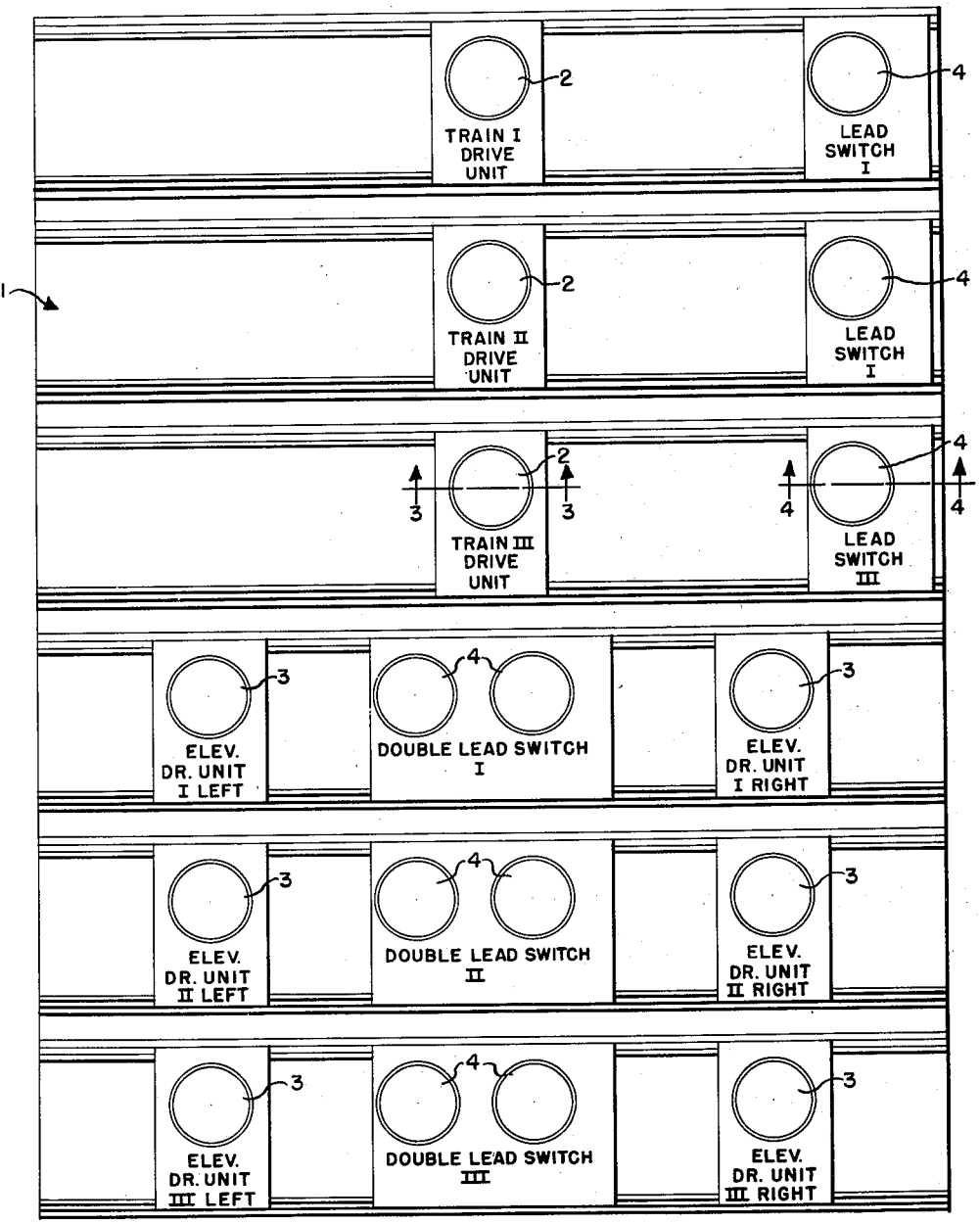
Fig. 2 is an elevational view of the control means for the interference eliminator.

The synchronous motors, collision circuits and priority circuits are located within a framework 1 (Fig. 2). A system for use with three turrets having two guns in each turret is shown. There is provided a synchronous motor 2 for each turret which drives a movable brush holder over a contact plate in response to movement of the turret in train. Since the two guns in each turret move independently in elevation, there is provided a synchronous motor 3 for each gun which drives a movable brush holder over a fixed contact plate in response to movement of a gun in elevation. Although the synchronous motors drive the brush holders at a speed equal to the speed the turret or gun is moving it is necessary to apply a lead to the gun position as indicated by the brush holder so that a collision may be predicted and avoided when the guns are moving towards one another at a relatively high velocity. This is accomplished by a lead switch which energizes brushes on the brush holder in advance of the brush representing the true position of the gun. These switches are operated by synchronous motors indicated in Fig. 2 at 4, and it can be seen that there is provided a switch for each turret in train and each gun in elevation. The construction and operation of these switches will presently be described in detail.

In Fig. 3 there is shown the arrangement of one of the brush holders and contact plates. The motor 2 is mounted within an opening in a U-shaped frame member 5 and a shaft 6 extending therefrom into a gear box 7. A pinion gear 8 extends from the lower end of this gear box and engages an elongated rack 9. This rack member is fixedly mounted on an upstanding member 11 which is secured to a brush holder 12. There is provided in framework 1 a side frame 13 which is provided with a recessed portion 14. Rollers 15 mounted on the brush holder ride within this recessed portion, and rollers 16 which are also rotatably mounted on the brush holder bear against member 13. It can be seen that by virtue of this construction the brush holder will move horizontally in response to energization of motor 2. There is provided a contact plate 17 which is composed of suitable insulating material and which is provided with contact elements 8. The brush holder is provided with a plurality of brushes 19 which engage the contact elements to complete a circuit to be hereinafter described in detail.

Figure 4:
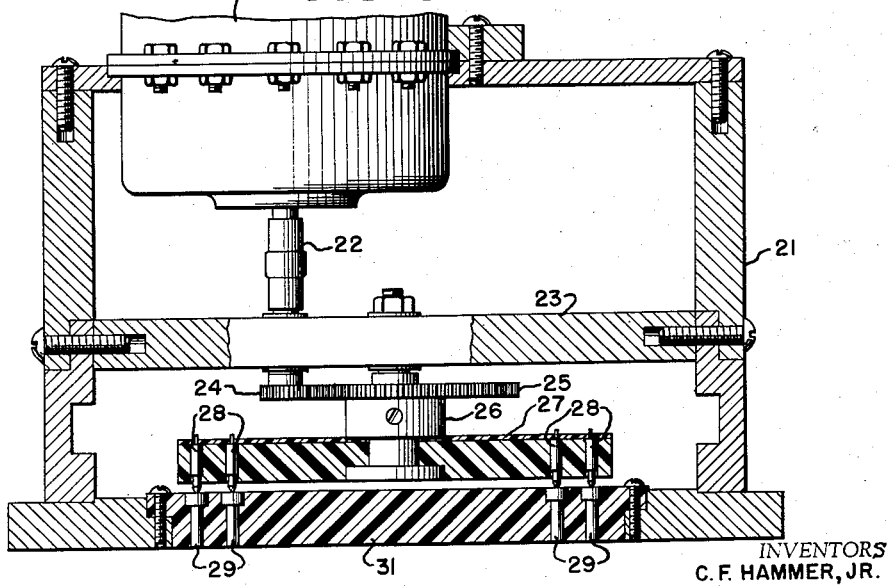
Fig. 4 is a sectional view of a lead switch taken along the line 4—4 of Fig. 2.

As previously pointed out the synchronous motors drive the brush holders over the contact plates at a rate corresponding to the rate of movement of the gun. However, it is apparent that when a gun is moving at a high rate of speed a longer period of time will be required to stop it and move it out of the collision area. Hence, it is necessary to provide a velocity lead switch to energize brushes in advance of the brush representing the true position of the gun. For example, in Fig. 3, if the center brush represents the true position of the gun in train and the brush plate is moving to the right at full speed, all the brushes to the right of the center brush will be energized. The velocity lead switch is shown in section in Fig. 4. The synchronous motor 4 is mounted in an opening in a U-shaped frame 21 and is provided with a shaft 22 extending downwardly therefrom through a bearing plate 23. The lower end of this shaft has mounted thereon a gear 24 which engages a gear 25 having a shaft 26 journalled in the bearing plate. This shaft has mounted thereon a brush holder 27 which is provided with brushes 28. These brushes engage contact elements 29 in contact plate 31.

The synchronous motors 4 move in 60° steps and contact elements 29 are positioned at appropriate points along the arc of movement of brushes 28. The brush holder assumes different positions when the gun is moving at full speed, half speed, zero, half speed reverse, and full speed reverse. The contact elements 29 are connected to the brushes 19 of brush holder 12 so that, as different contacts 29 are energized, various brushes 19 are energized whereby the gun position as represented on the brush holder 12 leads the true gun position.

It is apparent that each gun has a distinct collision pattern with each gun in the other turrets. Hence, it is necessary for each gun position indicator to have a separate row of contact elements so placed as to designate the collision area for each gun in the other turrets. The brush holder is, therefore, provided with a plurality of rows of brushes, each row included in the collision circuit of a gun with a gun in another turret. There is disclosed herein the collision circuit for two guns in different turrets. However, it is apparent that all the collision circuits are similar in nature, differing only in the specific location of the contact elements. In the circuits herein shown only portions of the brush holders and contacts plates are represented diagrammatically and different portions of these members are shown in different figures.

Figure 5:
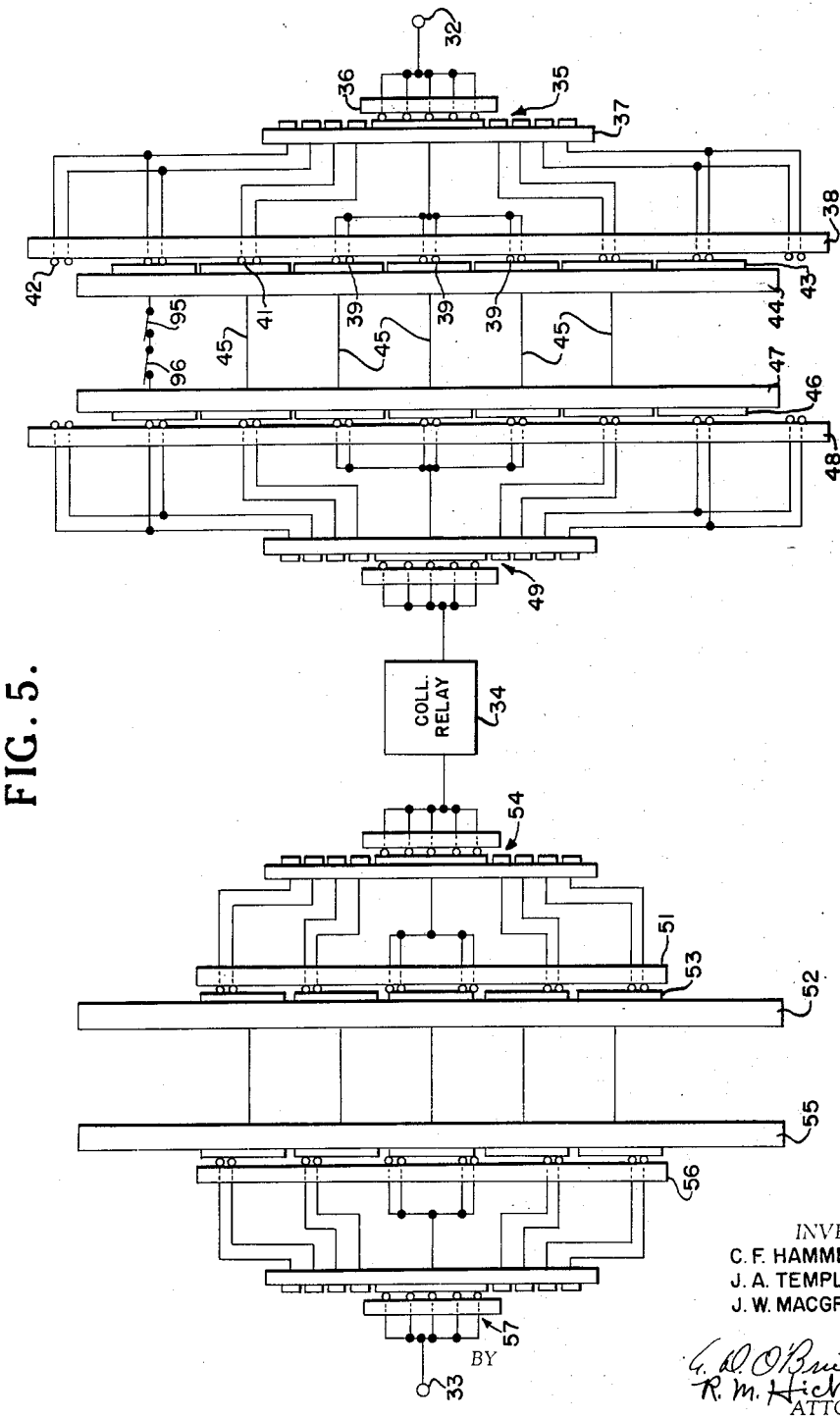
Fig. 5 is a wiring diagram of a typical collision circuit.

In Fig. 5 there is diagrammatically shown a typical collision circuit such as, for example, the collision circuit between the left gun in turret I and the left gun in turret II. Points 32 and 33 in the circuit are the source of electrical energy and when the circuit is completed the collision relay 34 is energized. The numeral 35 represents the lead switch for the left gun in turret II and it can be seen that the brush holder 36 is diagrammatically shown as adapted to energize various contact elements on contact plate 37 in response to variation in the rate of travel in train of this gun. The brush holder for the left gun of turret II in train is shown at 38 and the true position of the gun is represented by the center brushes 39. Brushes 41 are additionally energized when turret II is training to the left at from 0 to ½ speed by the movement of the lead switch. Brushes 42 are also energized by the lead switch when the turret is training at from ½ to full speed. The brushes on the opposite side of the center brushes 39 are similarly energized when the turret is moving in the opposite direction. The brushes engage contact elements 43 on contact plate 44 when the left gun in turret II is in an interference zone with respect to the left gun of turret I. The contact elements 43 are connected by leads 45 to contact elements 46 on plate 47 which represents the positions of the left gun in turret I in train. The brush holder 48 moves in response to movement of this gun in train and lead switch 49 operates similarly to lead switch 35 to energize the brushes on holder 48.

The brush holder 51 moves in response to movement of the left gun of turret II in elevation or depression and it passes over contact plate 52 which is provided with contact elements 53 at points along the path of elevation wherein a collision with the left gun of turret I is possible. The brushes are energized by lead switch 54 in a manner hereinbefore pointed out. The contact elements 53 are connected with contact elements on contact plate 55 over which rides brush holder 56 in response to movement of the left gun of turret I in elevation. Lead switch 57 is provided to energize various brushes in accordance with variation in the speed of movement in elevation of this gun. It can be seen that, when the four brush holders are resting on contact elements, the circuit will be completed and the relay 34 will be energized. Due to the positioning of the contact elements this relay will only be closed when a collision between the left guns in the I and II turrets is imminent.

The closing of the relay 34 energizes the elevation priority circuit which is shown in Fig. 6. The brush holder 51 of the left gun in turret II is provided with an additional set of brushes 57 which represent the true position of this gun in elevation. These brushes engage contact elements on contact plate 52 and the contact elements are connected by means of leads 58 with contact elements on contact plate 55. The brush holder 56 is provided with a plurality of brushes, the true position of the left gun of turret I being represented by brushes 59. It can be seen that with the guns in the positions shown the coil 61 by relay switch 62 will be energized and the switch will be positioned as shown. Switches 63 to 66 inclusive are simultaneously controlled from fire control to indicate which turret has priority. In the position shown priority is assigned to turret I so that turret II will be moved out of the collision area. It can be seen that in the illustrated positions of switch 62 and switches 63 to 66 the only relay to be energized is that which transmits to fire control a signal to elevate the left gun in turret II. This relay will continue to be energized until the brush holder 51 moves upwardly beyond the uppermost contact element shown on plate 52 at which time the left gun in turret II will be safely removed from the collision zone.

If the positions of switches 63 to 66 be reversed to shift the priority to turret II and the switch 62 remains in the position shown, the relay which transmits to fire control a signal to depress the left gun in turret I is energized and in addition coil 67 is energized. This coil energizes the train priority circuit of turret I which is similar to the train circuit of turret II which is energized by coil 68 and which circuits will be presently described in detail. The switch 62 will not be closed if the left gun in turret II is below the left gun in turret I. When this occurs and with the priority on turret I, the relay which transmits to fire control a signal to depress the left gun in turret II will be energized and in addition coil 68 will be energized which energizes the train priority circuit of turret II. It can be seen that an additional circuit is provided which is energized by switch 66 when priority is on turret II. The contact plate 55 is engaged by a brush 69 on brush holder 56. When the left gun in turret I is above a 45° elevation, this circuit will be completed to energize the relay serving to elevate this gun. It can be seen that switch 62 may also energize the relay transmitting a depression signal for this gun at the same time. However, the elevation relay is wired ahead of the depression relay so that when this condition occurs, the gun will always elevate. In general, the elevation priority circuit will cause the non-priority gun to elevate when it is above the priority gun and will cause the non-priority gun to depress and train out of the collision area when it is below the priority gun.

In Fig. 7 is shown the train circuit for turret I. This circuit is energized by closing any one of the four switches 71 to 74 shown. These switches are controlled by the various elevation priority circuits, switch 71, for example, being controlled by the energization of coil 67 (Fig. 6). The positions of the turrets in train are compared by the brush holders 38 and 48 and contact plates 44 and 47. The time position of turret I is represented by a point midway between the two brushes shown on holder 48 and the position of turret II is represented by brush 75. Coil 76 serves to energize both switches 77 and 78 whereas coil 79 operates switch 81. All switches are shown in the normal or unenergized position. When the turrets are in the positions shown the coil 76 will be energized whereby the positions of switches 77 and 78 will be changed. Switch 78 serves the function of merely opening the circuit to switch 81. Switch 77 closes the circuit to brush 82 on brush holder 48 which engages contact elements on plate 47. The contact elements are connected on one side of the zero position by lead 83 to coil 84 of a relay which transmits a train counter clockwise signal to fire control. The contact elements are connected on the other side of the zero position by lead 85 to coil 86 of a relay which transmits to fire control a train clockwise signal. When coil 79 is energized the switch 81 is shifted so as to energize coil 86 and cause clockwise train. In general, this circuit compares the position of the turrets in train and moves the non-priority turret clockwise or counter clockwise in train depending on which side of the zero position the turret is.

In Fig. 8 is plotted a typical interference pattern between two guns in different turrets. It can be seen that the collision area as represented by the curved line decreases with greater elevation. In theory the contact elements should be so positioned as to accurately represent this area. However, such a construction is difficult and hence, the contact elements are positioned to represent a rectangular area so as to enclose this curved area. In order to reduce the inefficiencies inherent in this system a circuit is provided which renders the collision circuits ineffective in fringe areas. Such areas are represented by the rectangular sections 87.

A typical fringe circuit is shown in Fig. 9. Leads 88 interconnect the end portions of contact plates 47 and 44 which represent the positions of turrets I and II in train. When both of the turrets are trained to either extremity the circuit is completed and coils 91—94 are energized. These coils open normally closed switches in the collision circuits. Coil 91, for example, serves to open switch 95 (Fig. 5) thereby preventing actuation of collision relay 34. Switch 96 also shown in Fig. 5 is opened by another similar fringe circuit operated by a comparison of the gun positions in elevation.

It can be seen that there has been provided by the mechanism herein disclosed a means for preventing collision between guns in different turrets. The positions of the guns is compared and a collision signal is produced when a collision is imminent. This signal closes an elevation priority circuit in which means is provided for assigning priority to one of the guns and in which the position of the guns in elevation is compared. This circuit transmits a signal to fire control whereby the non-priority gun is elevated or depressed out of the collision zone. This circuit in the event a depression signal is developed also energizes a relay to close a train priority circuit. The train circuit compares the positions of the turrets in train and transmits to fire control a signal to train clockwise or counterclockwise. There is further provided a fringe circuit which opens the collision circuit when the guns are in certain areas. The mechanism is entirely automatic in operation and is effective to prevent collisions between guns while maintaining a maximum amount of fire power available at all times.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A gun interference eliminator for preventing a collision between two guns in adjacent turrets comprising, means including movable brush holders and fixed contact plates responsive to movement of said guns for producing a signal when the guns approach a collision zone, means controlled by the velocity of the guns for energizing various brushes on said brush holders, means operable at will for assigning a predetermined priority to one gun, means including said brush holders and fixed contact plates for comparing the positions of said guns, said means being energized by said signal, and means responsive to said last named means for producing a second signal to drive the non-priority gun out of the collision area.

2. A gun interference eliminator for preventing a collision between two guns comprising, a circuit for each gun, each circuit comprising, a brush holder movable in response to movement of the gun, a plurality of aligned brushes carried by said brush holder, a fixed contact plate having contact elements thereon at points corresponding to positions of the gun in a collision area and adapted to be engaged by said brushes, and a collision relay adapted to be actuated when the brush holder for each gun rests on contact elements.

3. A gun interference eliminator for preventing a collision between two guns in adjacent turrets comprising, a circuit for each gun, each circuit comprising a brush holder movable in response to movement of a gun, a plurality of aligned brushes carried by said brush holder, a fixed contact plate having contact elements thereon at points corresponding to positions of the gun in a collision area, a collision relay adapted to be actuated when the brushes for each gun rest on said contact elements, and means responsive to actuation of said collision relay for comparing the positions of said guns.

4. In a circuit for preventing a collision between guns on adjacent turrets, a synchronous motor driven in response to movement of a gun, a brush holder having brushes carried thereby, means mounting said brush holder for slidable movement over a fixed contact plate, contact elements mounted on said contact plate at points representing a collision area with another gun and adapted to be engaged selectively by said brushes, and a relay energized in response to completion of a circuit when said brush holder passes over and said brushes engage said contact elements.

5. In a gun interference eliminator, a circuit comprising, a first pair of contact plates representing the path of movement of a pair of adjacent guns in train, a first pair of brush holders movable over said contact plates in synchronism with movement of said guns in train, a second pair of contact plates representing the path of movement of said pair of guns in elevation, a second pair of brush holders movable over said contact plates in synchronism with movement of said guns in elevation, contact elements on said first and said second pairs of contact plates at points representing a collision zone between said guns, brushes on said brush holders representing the true positions of said guns in train and elevation, and a circuit through said brushes and contact elements adapted to be completed when said guns are in a collision zone in train and elevation.

6. A gun interference eliminator as claimed in claim 5 wherein said circuit includes means for applying a velocity lead to said brushes.

References Cited in the file of this patent

UNITED STATES PATENTS

| | | |
|---|---|---|
| 2,424,654 | Watkins | Jan. 20, 1948 |
| 2,583,058 | Libman | Jan. 22, 1952 |
| 2,633,060 | Topham | Mar. 31, 1953 |
| 2,692,534 | Pluess | Oct. 26, 1954 |
| 2,750,553 | Andersson | June 12, 1956 |